US006754265B1

(12) United States Patent
Lindemann

(10) Patent No.: US 6,754,265 B1
(45) Date of Patent: Jun. 22, 2004

(54) VOCODER CAPABLE MODULATOR/ DEMODULATOR

(75) Inventor: Brian Lindemann, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/491,363

(22) Filed: Jan. 26, 2000

Related U.S. Application Data

(60) Provisional application No. 60/118,882, filed on Feb. 5, 1999.

(51) Int. Cl.[7] .............................. H04B 1/66; H04B 1/38

(52) U.S. Cl. ....................................... 375/240; 375/222

(58) Field of Search ................................ 375/257, 222; 455/462, 41, 410; 370/260, 267, 276

(56) References Cited

U.S. PATENT DOCUMENTS

| | | | | | |
|---|---|---|---|---|---|
| 4,170,719 | A | * | 10/1979 | Fujimura | 704/208 |
| 4,433,434 | A | * | 2/1984 | Mozer | 704/211 |
| 4,703,505 | A | * | 10/1987 | Seiler et al. | 704/268 |
| 4,864,566 | A | * | 9/1989 | Chauveau | 370/521 |
| 5,473,727 | A | * | 12/1995 | Nishiguchi et al. | 704/222 |
| 5,546,395 | A | * | 8/1996 | Sharma et al. | 370/468 |
| 5,623,575 | A | * | 4/1997 | Fette et al. | 704/265 |
| 5,734,789 | A | * | 3/1998 | Swaminathan et al. | 704/206 |
| 5,828,993 | A | * | 10/1998 | Kawauchi | 704/202 |
| 6,122,607 | A | * | 9/2000 | Ekudden et al. | 704/212 |
| 6,212,228 | B1 | * | 4/2001 | Vlajnic | 375/222 |
| 6,233,460 | B1 | * | 5/2001 | Nojima | 455/462 |

FOREIGN PATENT DOCUMENTS

| | | | | |
|---|---|---|---|---|
| DE | 2435654 | A1 | * | 2/1976 |
| EP | 0 725 382 | A2 | * | 8/1996 |

* cited by examiner

*Primary Examiner*—Stephen Chin
*Assistant Examiner*—Lawrence Williams

(57) ABSTRACT

A method and apparatus for data transmission using existing highly compressed telecommunications media, and in particular encoding, transmitting, receiving, and decoding digital data using vocal sounds.

26 Claims, 3 Drawing Sheets

VOCODER CAPABLE MODULATOR/ DEMODULATOR

This application claims the benefit of U.S. Provisional Application Serial No. 60/118,882, filed in the name of Brian Lindemann on Feb. 5, 1999, the complete disclosure of which is incorporated herein by reference.

FIELD OF THE INVENTION

The invention relates to data transmission using existing telecommunications media, and in particular relates to a technique for encoding, transmitting, receiving, and decoding digital data using vocal sounds.

BACKGROUND OF THE INVENTION

The demand today is for higher and higher rates of data communication. As networks continue to gain acceptance and favor, there is a continuing desire to transmit ever-increasing amounts of data across the transmission medium in a given amount of time. The main complaint against the current land-line telephone modem system is its low throughput. Today, higher digital connectivity data rates are being demanded by users for Internet access, telecommuting, video conferencing, and similar applications. This demand has led to many techniques and systems for increasing the data bandwidth, such as the use of integrated services digital networks (ISDN), and T-carrier services such as T1 and T3. ISDN transmits at a data rate of 128 kilobits/second (KBPS), while T1 transmits at a significantly higher 1.544 megabits/second (MBPS). One technology, referred to as digital subscriber line (DSL) technology, allows digital information to be transferred via existing copper-based twisted-pair telephone lines at rates as high as 6 MBPS. In other words, the increased demand for network solutions has propelled the need to maximize the data bandwidth.

In the cellular arena, current telecommunication systems include both analog and digital systems. Analog cellular systems, which currently dominate cellular transmission systems, suffer a variety of problems, including low bandwidth. As with the present telephone modem system, the main drawback of the current cellular modem system is its low throughput. Achieving the maximum throughput in the range of 9000 BPS is difficult, due to the noisy environment of the cellular modem system. Throughput is typically in the range of 4800 to 9600 bits per second (BPS). However, such emerging and existing data communication applications as effective wireless access to the Internet, the World Wide Web, and other information systems require the availability of large bandwidths to exchange information. Inventions such as that disclosed in U.S. Pat. No. 5,946,633, the complete disclosure of which is incorporated herein by reference, attempt to increase the bandwidth of analog cellular systems to support emerging and existing data communication applications requiring such large bandwidths.

While some strive to increase the bandwidths of existing telecommunications systems, others use the existing restricted bandwidth available on present land-line, cellular, and satellite telephone systems to transmit ordinary voice information.

Present telephone systems are designed to use low data-rate voice compression techniques for efficiently transmitting voice information on the existing restricted bandwidth. Human speech is typically digitized and compressed to enable the voice signal to be transmitted over a limited bandwidth channel over a relatively low bandwidth communications link, such as the public telephone system. The amount of compression, referred to as the "compression ratio," is inversely related to the bit rate of the digitized signal. More highly compressed digitized voice signals with relatively low bit rates, such as 2400 BPS, can be transmitted over relatively lower quality communications links with fewer errors than less compressed voice signals with higher bit rates, such as 4800 BPS or more.

Several methods are known for digitizing and compressing human speech. One example, linear predictive coding using ten reflection coefficients of the analog voice signal, known as LPC-10, produces compressed digitized voice at 2400 BPS in real time, i.e., with a fixed, bounded delay with respect to the analog voice signal. LPC-10e is a single-stage voice compression algorithm defined in federal standard FED-STD-1015, entitled "Telecommunications: Analog to Digital Conversion of Voice by 2,400 Bit/Second Linear Predictive Coding," which is incorporated in its entirety herein by reference. Although LPC-10 is a "lossy" compression procedure in that some information contained in the analog voice signal is discarded during compression, the amount of loss is generally slight, and the reconstructed voice signal is an intelligible reproduction of the original analog voice signal.

Various attempts have been made to increase the compression of the analog voice signal. For example, U.S. Pat. No. 5,742,930, the complete disclosure of which is incorporated herein by reference, discloses a multi-stage voice compression algorithm to increase the overall compression ratio between the incoming analog voice signal and the resulting digitized voice signal over that obtained using only a single compression stage, without sacrificing the intelligibility of the subsequently reconstructed analog voice signal. The greater compression allows speech to be transmitted over a channel having a much smaller bandwidth than would otherwise be possible, thereby allowing the compressed signal to be sent over lower quality communications links.

U.S. Pat. No. 5,546,395, the complete disclosure of which is incorporated herein by reference, discloses a method for communicating analog voice signals as digital data using standard telephone lines by compressing the digital data and placing the compressed data into packets for transfer over the telephone lines. A voice control digital signal processor (DSP) operates one of several speech compression algorithms which produce a scaleable amount of compression, the compression ratio being inversely proportional to the quality of the speech the compression algorithm is able to reproduce. The higher the compression, the lower the reproduction quality. The compression ratio is selected based on various factors, including the speed or data bandwidth on the available communications connection.

However, while inventors strive to increase the bandwidths of existing telecommunications systems and others attempt to increase the amount of voice data transmitted over the low speed, or data bandwidth, available on present telephone systems, low speed data transmission using the existing bandwidth is being overlooked. As disclosed in U.S. Pat. No. 5,559,799, the complete disclosure of which is incorporated herein by reference, modern modulator/demodulator apparatus, commonly known as "modems," are used widely for transmission of data in analog circuits which use a voice band. Prior art attempts to increase data using the existing bandwidth, and voice compression techniques fail to provide transmission of data in other bandwidths because voice compression does not provide for the transmission of traditional modem tones. Furthermore, as yet unforeseen emerging technologies will need a method of low bandwidth data transmission during their infancy, if not beyond.

Therefore, what is needed is a technique for encoding, transmitting, receiving, and decoding digital data using the low bandwidth voice modulation/encoding techniques currently available on existing telecommunications systems.

SUMMARY OF THE INVENTION

The present invention overcomes the limitations of the prior art by providing a technique for encoding, transmitting, receiving, and decoding digital data using the low bandwidth voice modulation/encoding techniques currently available on existing telecommunications systems.

The present invention provides a method and device for modulating digital data into traditional human vocal tract sounds upon which a voice compression system operates, and decompressing and demodulating the received signal. The invention also provides optional clocking data included in the modulated signal to provide self clocking for incorporation into telecommunications systems having variable delay from transmitter to receiver, such as one of the known satellite communications systems available for air transport applications. The invention further provides optional error correction data that is optionally encoded into the modulated signal for robustness. The modulation/demodulation method of the invention provides a dictionary of voiced and unvoiced vocal sounds distinguishable by existing voice encoder/decoders, commonly referred to as "vocoders." Digital data are preferably modulated and demodulated according to this dictionary.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

Figure 1:
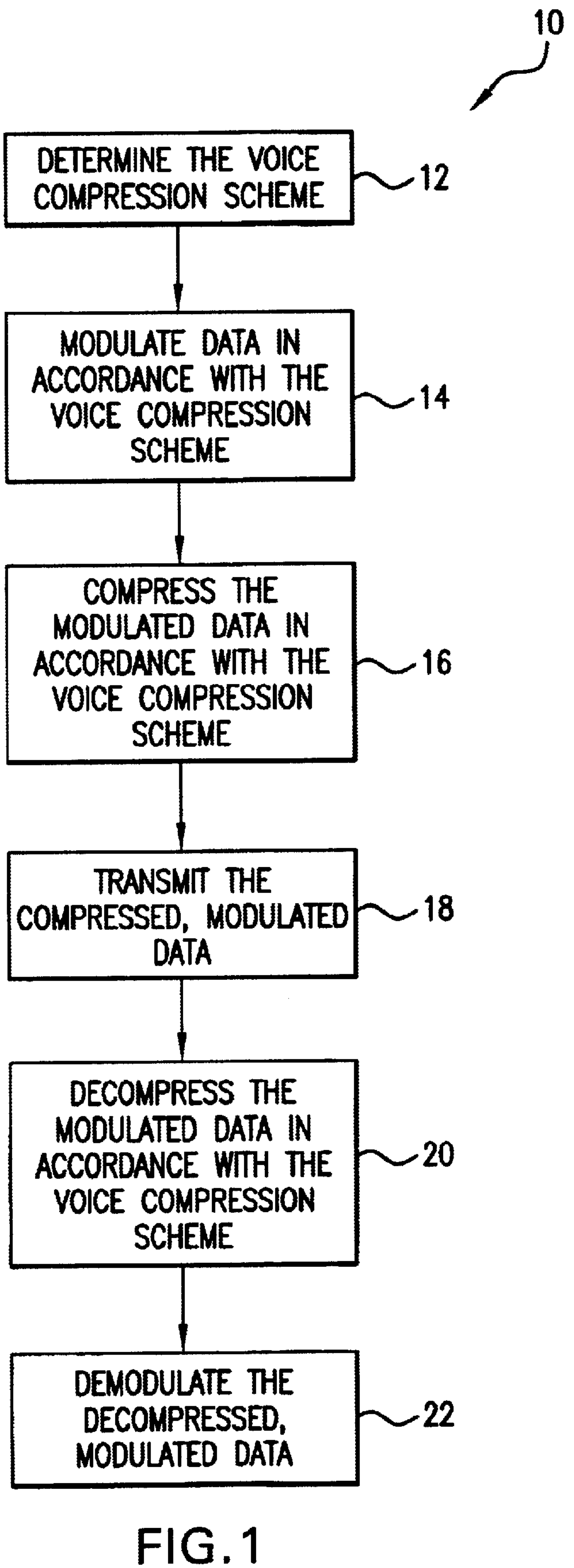
FIG. 1 is a block diagram illustrating the method of the invention for modulating data into voice signals for transmission over low quality transmission lines.

In the Figures, like numerals indicate like elements.

The present invention is a new technique for encoding, transmitting, receiving, and decoding digital data, wherein the digital data is converted to an analog or voice signal for transmission over lesser quality transmission media, such as narrow band land-lines and radio frequencies. The invention relates to narrow bandwidth data transmission using existing telecommunications media, and in particular relates to a technique for encoding, transmitting, receiving, and decoding digital data using vocal sounds. While the invention is described with reference to a satellite telecommunications application, the invention is equally applicable to other narrow bandwidth data transmissions using existing telecommunications media. For example, applications such as telemetry having very low data rates, the invention provides an attractive, low cost technique for data transmission, wherein the a voice transmission is used to transmit digital data using vocal sounds.

The invention is a modulator/demodulator, or MODEM, for converting digital data into traditional human vocal tract sounds upon which a voice compression system operates, and decompressing and demodulating the received signal. Optional clocking data are included to provide self clocking for incorporation into telecommunications systems having variable delay from transmitter to receiver, such as one of the known cellular or satellite communications systems available for air transport applications. Preferably, error correction data, i.e., one or more parity bits, are encoded into the voice stream for robustness. The digital data are converted according to a dictionary of voiced and unvoiced vocal sounds distinguishable by existing voice encoder/decoders, commonly referred to as "VOCODERS." VOCODERS are well known in the communications arts. For example, vocoders are described in "Speech And Audio Coding For Wireless And Network Applications," edited by Bishnu S. Atal, Vladimir Cuperman, and Allen Gersho, 1993, by Kluwer Academic Publishers, the text of which is incorporated in its entirety herein by reference. Vocoders are widely available and manufactured by companies such as Qualcomm Incorporated of San Diego, Calif., and Lucent Technologies Incorporated, of Murray Hill, N.J. Vocoders are also disclosed in U.S. Pat. Nos. 5,781,593 and 5,960,386, the complete disclosures of which are incorporated herein by reference.

The analog speech signal is digitized by passage through an analog to digital converter, and is broken into frames. Each frame is typically on the order of 20 milliseconds, but may vary widely within the scope of the invention. A VOCODER is used to encode the digitized voice signals so as to minimize the amount of bandwidth that is used for transmitting over communication channels. Voice compression is performed using any one of the several known voice compression algorithms, such as LPC-10; the multi-stage voice compression algorithm disclosed in above incorporated U.S. Pat. No. 5,742,930; or another suitable voice compression algorithm, to produce a voice/data signal in real time with respect to the voice signal, as described above. Alternatively, compression is performed so that the output signal is delayed with respect to the voice signal.

The output signal is either stored as a data file, or not. One alternative is to transmit the output signal to a remote location, for example, over a telephone line, radio frequency, or other telecommunications medium, for decompression of the voice signal and reconstruction of the original data signal. Alternatively, the output signal is stored for later transmission.

The encoded speech is received by the decoder section of a similar VOCODER at the other end of a communication channel. The decoder uses the encoded signals received from the transmitting VOCODER to produce digitized speech. Upon receipt, the output signal is decompressed by applying an analog of the compression algorithm, meaning that the number of bits per second representing the speech is increased, or that the compressed signal is expanded with respect to the output signal. Compression and decompression are performed in such manner that the reconstructed voice signal is substantially identical to the original voice signal. An analog of the data-to-voice conversion algorithm is applied to the reconstructed voice signal in such manner that the recovered, or re-converted, data signal is substantially identical to the original data signal.

As will be appreciated by those skilled in the art, many different types of data compression techniques are known and described in the prior art, of which LPC-10 is just one example. The present invention departs from the teachings of the prior art by providing a data conversion algorithm based on vocal sounds in a bandwidth compatible with the existing restricted bandwidth typical of present telephone systems, either copper-based twisted-pair land-line telephone systems or radio frequency analog cellular and satellite systems, or another low speed, narrow bandwidth communications system.

The present invention converts digital data into vocal tract sounds compatible with a conventional VOCODER. Conventional vocoders distinguish two basic vocal sounds: voiced and unvoiced. Simply stated, voiced sounds are the sounds attributable to vowels, while un-voiced are the sounds typically attributable to consonants. In a preferred embodiment, the invention switches between unvoiced consonant and voiced vowel sounds to provide self-clocking. The consonant and vowel sounds used provide the data. In preferred embodiments of the invention, the consonant and vowel sounds are chosen to maximize the differentiation between sounds through the VOCODER. According to preferred embodiments of the invention, data are encoded using multiple consonant and vowel sounds, such that more than one binary digit is encoded per change. For example, one encoding scheme is given as:

change from unvoiced sound to long ‘a’ as in “way” is a binary 11 (written ‘A’);

change from unvoiced sound to long ‘e’ as in “see” is a binary 10 (written ‘E’);

change from unvoiced sound to short ‘a’ as in “saw” is a binary 01 (written ‘a’);

change from unvoiced sound to short ‘o’ as in “show” is a binary 00 (written ‘O’);

change from voiced sound to ‘sh’ as in “she” is a binary 1 (written ‘sh’);

change from voiced sound to ‘s’ as in “pass” is a binary 0 (written ‘s’); and special voiced consonant sound ‘v’ as in “ever” provides byte synchronization (written ‘v’).

Accordingly, the letter “A,” which is 0100 0001 in ASCII binary, is encoded as right-most or least significant bit (LSB) first:

$$\overset{v}{s}\_\overset{E}{10}\_\overset{s}{0}\_\overset{O}{00}\_\overset{s}{0}\_\overset{E}{10}\_\overset{v}{s}.$$

The character “7,” which is ASCII binary 0011 0111, is encoded as right-most or least significant bit (LSB) first:

$$\overset{v}{s}\_\overset{A}{11}\_\overset{sh}{1}\_\overset{a}{01}\_\overset{sh}{1}\_\overset{O}{00}\_\overset{v}{s}.$$

The above examples include the optional self-clocking bit to provide for the case of a variable delay from air to ground, as experienced in telecommunications systems having a variable delay from transmitter to receiver, such as satellite communications systems available for air transport applications.

Furthermore, those of ordinary skill in the art will appreciate that the data-to-voice conversion is alternatively accomplished using one or more different consonant and vowel sounds than those shown in the above examples, and that the scope of the present invention contemplates such other consonant and vowel sounds. For example, an unvoiced vowel sound rather than a voiced consonant sound alternatively provides byte synchronization. Also, alternatives to the particular multiplicity of the consonant and vowel sounds than those shown in the above examples are contemplated to be within the scope of the present invention, wherein more or less consonant and vowel sounds than those shown are used to convey information. Thus, the above examples are intended only to convey concrete examples of the invention, and are not intended to limit or restrict the scope of the invention in any way. For example, the invention contemplates using a different, non-specific, coding scheme providing three bits of information for each change between voiced and unvoiced sounds.

FIG. 1 is a block diagram illustrating the method 10 of the invention for modulating data into voice signals for transmission over low quality transmission lines. At block 12 of FIG. 1, a voice compression algorithm is chosen from among the many known voice compression algorithms. For example, any of a basic, single-stage voice compression algorithm such as LPC-10 defined in above incorporated federal standard FED-STD-1015, “Telecommunications: Analog to Digital Conversion of Voice by 2,400 Bit/Second Linear Predictive Coding,” is selected. Alternatively, a more sophisticated multi-stage voice compression algorithm such as that disclosed in above incorporated U.S. Pat. No. 5,742,930, or another suitable voice compression algorithm is selected. The modulation method is optionally one of several different methods of modulation methods, including, for example, frequency modulation, four-phase differential phase shift modulation, quadrature amplitude modulation, and phase amplitude modulation. Modulation method selection may depend, for example, on the speed of communication. A selected communication protocol defines the method in which various remote devices or stations communicate with the communication network, e.g., in order to place and receive telephone calls. Depending upon protocol, modems incorporated in, for example, a facsimile apparatus switch between the modulation and emodulation modes, as well as the communication speed. Conventionally, the modem follows an instruction from the DTE, the host apparatus of a modem, to switch to the appropriate operational mode. The DTE also provides timing synchronization of a mode switch between a transmitter and a receiver.

At Block 14, the data to be converted are modulated in accordance with the selected voice compression scheme using the above data-to-voice conversion algorithm, or one of the alternative versions thereof, all of which are within the contemplated scope of the invention. Preferably, a DSP operating the data-to-voice conversion algorithm generates the modulated data in accordance with a “dictionary” of vocal sounds, wherein each vocal sound used in the data-to-voice conversion is mapped to a predetermined binary value such that each vocal sound in the modulated data has a unique binary value. The modulated data are preferably generated by the DSP at a higher change rate than normal voice. The modulated data are compressed at Block 16 in accordance with the selected voice compression scheme. At block 18, the modulated and compressed data are transmitted via the communications medium utilizing the available bandwidth.

At Block 20, the modulated and compressed data are received and decompressed in accordance with the voice compression scheme. Decompression uses an analog of the voice compression scheme selected at Block 12 and utilized at Block 16 to compress the data. Preferably, at Block 22 a DSP operating an analog of the data-to-voice conversion algorithm used to generate the modulated data is used to decode the information at the receiving end. The analog conversion algorithm consults the same dictionary of vocal sounds, or an analog thereof, to demodulate the vocal sound transmission and retrieve the original data.

While presented in reference to a wireless telecommunications network, the teachings of the present invention have broad applicability to telecommunications systems in general, and in particular to cellular radio systems which are but one example of wireless communications. It will be appreciated, however, that the present invention is not limited to cellular radio systems and may be implemented in non-cellular telecommunications systems as well. Furthermore, the modulation algorithm of the invention is equally applicable to any communications systems using either copper-based twisted-pair telephone land-line systems or radio frequency analog cellular systems, or another low speed, narrow bandwidth communications system.

In a typical wireless communication network, one or more base stations are selectively positioned within respective, defined geographic areas or "cells," and are used to transmit and receive communication signals to and from, respectively, one or more remote stations, e.g., mobile or cellular telephone handsets, located within the respective cell. In particular, the base stations act as both intermediary points by which a communication path may be periodically established and maintained with respective remote stations, as well as end points of a hierarchical stationary network, which also includes an overlay or backbone network, such as, for example, a public switched telephone network, or "PSTN."

A selected communication protocol defines a method by which the various remote stations communicate with one or more base stations of the communication network, for example, in order to place and receive telephone calls. The communication protocol preferably provides air-channel agility between respective base stations and remote stations, while also providing a secure transmission link. A fundamental factor in the selection of a communication protocol for a network is the ability of the remote stations to communicate with the base stations in a simple, flexible and rapid manner, for example, so that a remote station is not required to wait to establish a communication path, and/or so that a hand-off of an active call between base stations in a mobile network is transparent to a respective remote station. In this respect, the ability to acquire and maintain voice-path synchronization between a base station and a remote station is a consideration.

In a typical digital communication network, analog voice signals are converted to a digital data stream for network transmission by pulse code modulation, or "PCM," sampling at a basic telephony rate of 8 kHz by a digital coder/decoder unit, commonly referred to as a "CODEC" unit. Because the nominal bit rate of digitized voice transmitted over a terrestrial network is typically greater than the available over-the-air bit stream bandwidth over a wireless communication link between a respective base and remote station pair, the PCM voice bit stream is typically coded by a VOCODER, for over-the-air transmission. At the receiving end, the data is then decoded by a similar VOCODER.

Generally, the VOCODER in the transmit direction compresses the digitized speech. Conversely, in the receive direction, the VOCODER decompresses the received data into its original analog form. A more specific background description of vocoders used in mobile communication networks is provided in U.S. Pat. No. 5,414,796, entitled, "Variable Rate VOCODER," the complete disclosure of which is incorporated by reference herein.

In a time division multiple access, or "TDMA," based digital communication system, the compressed voice data is commonly transmitted over-the-air between respective base and remote stations in short transmission bursts, wherein a fixed quantity or "frame" of data is serially transmitted during each transmission burst. The data frame typically includes both bearer information, for example, compressed PCM voice, and overhead information, for example, control bits and signaling D channel and/or error correction or parity bits.

The transmission and reception of data by the respective base and remote station vocoders are typically synchronized in order to establish and maintain a voice path link for sending and receiving "voice frames." This synchronization is typically accomplished by serial in-band transmission of the above described or another synchronization data pattern, which is generated by the transmitting device at one end and recognized by the receiving device at the other end. Although the transmission of additional synchronization data within a respective remote station or base station does not, in itself, result in a serious voice path bandwidth constraint, the over-the-air path is traditionally more prone to transmission errors than wire-based transmission, this additional overhead subjects the entire voice frame to a greater likelihood of failure. Therefore, in a preferred embodiment, error correction data is included in the transmission using any known method.

Figure 2:
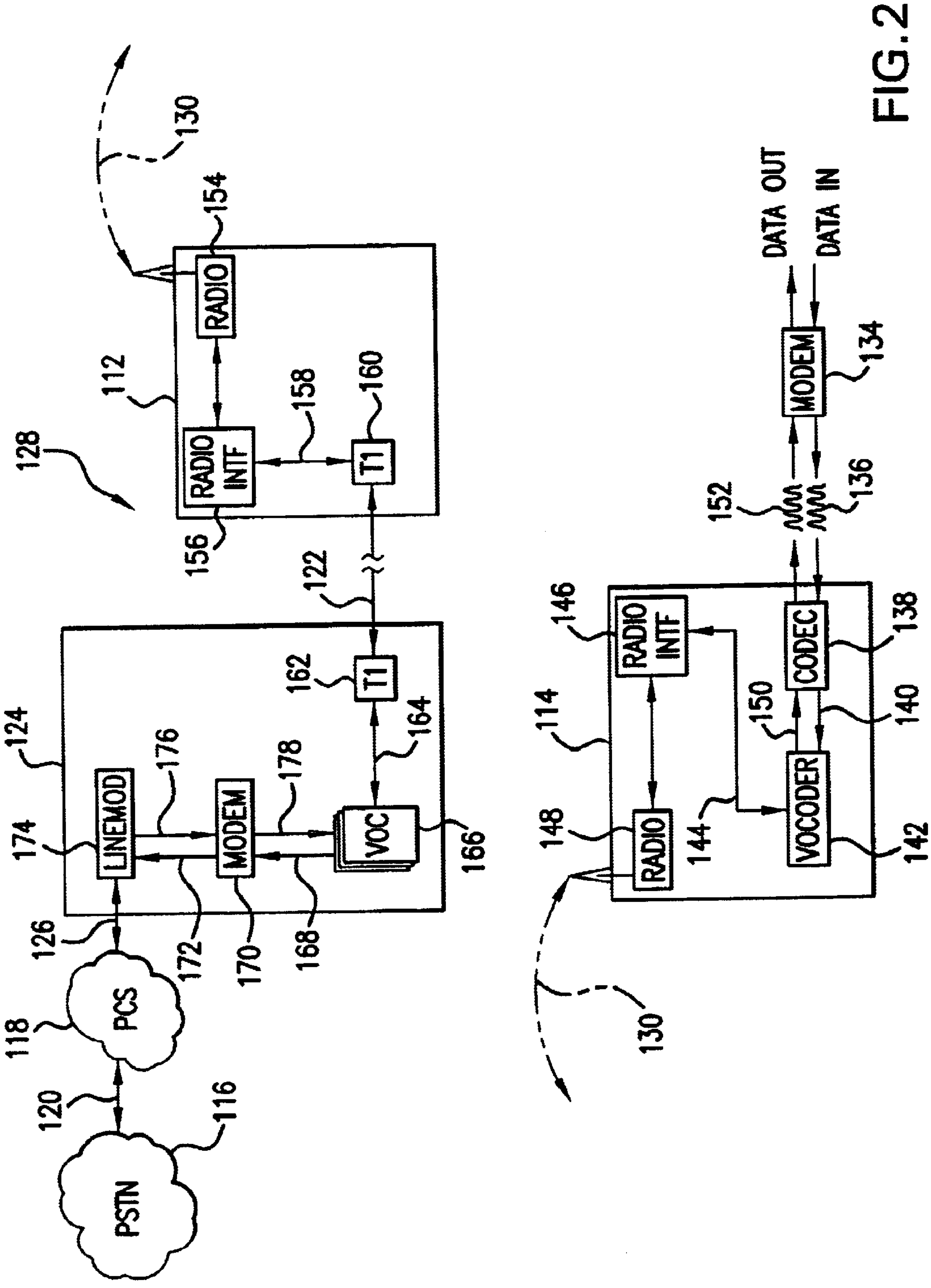
FIG. 2 illustrates an exemplary wireless communication network that includes multiple base stations, wherein each base station is located within a respective geographic cell.

FIG. 2 illustrates an exemplary wireless communication network 100 that includes multiple base stations 112, wherein each base station 112 is located within a respective geographic cell. Multiple active independent remote stations 114 are distributed throughout the network 110, with multiple remote stations 114 typically located in a particular geographic cell at any given instant. Remote stations 114 may be mobile handsets or fixed premises remote units. Preferably, each base station 112 and each remote station 114 includes a radio transmitter and receiver. Base stations 112 and remote stations 114 communicate with one another as described, for example, by above incorporated U.S. Pat. No. 5,781,593. In particular, base stations 112 perform over-the-air radio frequency transmission and reception to remote stations 114 located within its cell area, and contain the equipment needed to communicate with respective remote stations 114. Thus, base station 112 supports the over-the-air, terrestrial, and signaling links necessary for fully linking remote station 114 to an overlay network 116, such as, e.g., a public switched telephone network or "PSTN" through personal communications switching or "PCS" network infrastructure 118 via interface 120.

Each base station 112 may be connected, via back haul lines 122, to a respective base station controller or "BSC" 124, which controls the two-way transmissions of multiple base stations to provide certain operations such as, e.g., call handoffs between base stations, bearer data encoding and decoding, as well as general support functions, as described in above incorporated U.S. Pat. No. 5,781,593. Base station controllers 124 are connected, in turn, to overlay network 116 via further back haul lines 126.

As also described in above incorporated U.S. Pat. No. 5,781,593, each base station 112 communicates with remote stations 114 using over-the-air loop having a number of individual air channels or "time slots." Each time slot is used by a remote station 114 to communicate with base station 112. Preferably, remote station 114 communicates with base station 112 using a FDD protocol, such as that embodied in the standards defined by the Global System for Mobile Communications or "GSM," the radiotelephone system currently in use in Europe.

In FIG. 2, a synchronized communication path 128 between a respective remote station 114 and a respective base station 112 is acquired and maintained via an over-the-air or "OTA" time slot 130 of the over the air loop of respective base station 112. A general description of a voice path through the communication link 128 follows, where, for purposes of uniformity, transmission in the remote station-to-base station direction is referred to herein as "downlink" transmission, and transmission in the base station-to-remote station direction is referred to as "uplink" transmission.

In the uplink direction remote station 114 transmits digital data 132 that are modulated using the above described data-to-voice conversion algorithm, or one of the alternative versions thereof. Preferably, a MODEM 134 operating the above described data-to-voice conversion algorithm generates the modulated data signal 136 in the form of vocal tract sounds compatible with a conventional VOCODER. Modulated data signal 136 is preferably converted by a CODEC circuit 138 into an uplink PCM data stream 140. The uplink PCM data stream 140 is input into a remote station VOCODER 142, which preferably encodes the PCM data in accordance with a selected voice compression algorithm, and then transmits the encoded PCM data in a series of respective uplink voice frames over a full duplex bus 144 to a remote station radio interface circuit 146, wherein a single voice frame is transmitted from radio interface circuit 146 to radio 148 during each remote station transmit interval of respective acquired OTA time slot 130.

In the downlink direction, respective downlink voice frames are received at remote station radio 148 and transmitted to radio interface circuit 146 during each base station transmit interval of respective acquired OTA time slot 130. The "encoded" or modulated data is then transferred from radio interface circuit 146 to VOCODER 142 via bus 144. The respective downlink voice frames are decoded by VOCODER 142 into a downlink PCM data stream 150, preferably having the same transmission rate as the outgoing PCM data stream 130. Downlink PCM data stream 150 is converted by CODEC 138 into modulated voice signal 152, which is formed of the above described vocal tract sounds. Modulated voice signal 152 is received by the operator, preferably, MODEM 134, operating the above described voice-to-data conversion algorithm.

In a preferred embodiment, the bearer information includes both encoded voice, error correction, and synchronization data in accordance with the selected algorithm employed by VOCODER 142. According to alternate preferred embodiments, bearer information bytes transmitted between VOCODER 142 and radio interface circuit 146 include encoded voice, with error correction and synchronization information added to downlink voice frames or deleted from uplink voice frames, respectively, at the remote station radio interface circuit 146. According to another alternative embodiment, control and status information precede bearer information. In either case, however, the preferred serial interface includes a bearer information field in each voice frame transmitted in either direction between respective VOCODER 142 and radio interface circuit 146.

In the uplink direction, synchronization pattern bytes and control and status bytes, respectively, are optionally stripped from each voice frame at remote station radio interface circuit 146, with the bearer data transmitted over OTA slot 130 by remote station radio 148 during the respective remote station transmit interval. Likewise, in the downlink direction, bearer data is optionally received by remote station radio 148 during each base station transmit interval. Bearer data bytes received via downlink are forwarded to remote station radio interface circuit 146, which preferably appends the synchronization pattern bytes and control and/or status data bytes to the received bearer data bytes, thereby forming a complete downlink voice frame in accordance with the defined serial interface.

At the base station end of communication link 128, a base station radio 154 portion of base station 112 receives the bytes of uplink bearer data transmitted from remote station 114 over OTA channel 130 during the respective remote station transmit intervals, and forwards the data to a base station radio interface circuit 156. The synchronization pattern bytes and control and/or status data bytes are appended to the uplink bearer data bytes received from remote station 114, thereby reforming a complete uplink voice frame.

The uplink voice frames are transmitted over a duplex bus 158 from the base station radio interface circuit 156 to an interface module 160, for example, a commonly known T1 interface module, which relays the respective voice frames over backhaul facility 122 to a corresponding interface module 162 located at a respective base station controller or "BSC" 124 or other network subsystem. From BSC interface module 162, the downlink voice frames are preferably forwarded over a BSC duplex bus 164 to an assigned VOCODER 166, which is optionally one of multiple vocoders located at BSC 124. The respective uplink voice frames are decoded by VOCODER 166 into a modulated non-compressed PCM data stream 168, preferably having the same transmission rate as the remote station PCM data stream 130. PCM data stream 168 is transmitted to a respective MODEM 170 for decoding. At the receiving end, MODEM 170 operates an analog of the data-to-voice conversion algorithm employed in generating the modulated data to "decode" or demodulate the information carried in modulated non-compressed PCM data stream 168. Decompressed and demodulated data stream 172 is preferably transmitted to a respective BSC line module 174 for further routing, e.g., over backhaul facility 126 to overlay network 116. Alternatively, MODEM 170 is located at the receiving device connected to transmit and receive communications via overlay network 116.

In the downlink direction, a downlink PCM data stream 176, which carries downlink bearer information having data intended for respective remote station 114 via communication link 128, is transmitted from BSC line module 174 to MODEM 170. The downlink bearer data are "encoded" or modulated in accordance with the voice compression scheme employed by VOCODER 166 using any of the above described data-to-voice conversion algorithm or one of the alternative versions thereof. Modulated data stream 178 is transmitted to respective VOCODER 166. VOCODER 166 encodes the downlink PCM data from modulated signal 178 in accordance with a selected voice compression algorithm and outputs the encoded data in a series of respective downlink voice frames, which are transmitted over duplex bus 164 to BSC interface module 162. BSC interface module 162 relays the downlink voice frames to respective base station interface module 160, via backhaul facility 122. From base station 112 interface facility 160, the downlink data frames are forwarded over bus 158 to base station radio interface 156, which strips off the respective synchronization pattern bytes and control and status bytes, with the bearer data bytes of each downlink frame transmitted by base station radio 154 over OTA slot 130 during the respective base station transmit interval. The control and status bytes are monitored by the protocol processor and appropriate control traffic messages are sent as part of the protocol.

To initially acquire and thereafter maintain synchronization, preferably after a synchronized OTA channel 130 has been acquired, the respective remote and base station vocoders 142 and 166 each send respective downlink and uplink voice frames during the respective remote and base station transmit intervals of the acquired time slot. Preferably at the same time, both vocoders 142 and 166 scan the respective incoming data to detect the synchronization data pattern. Upon detecting synchronization pattern bytes, respective VOCODER 142 or 166 processes the ensuing serial data as the initial bearer and control information of a respective new incoming voice frame.

Figure 3:
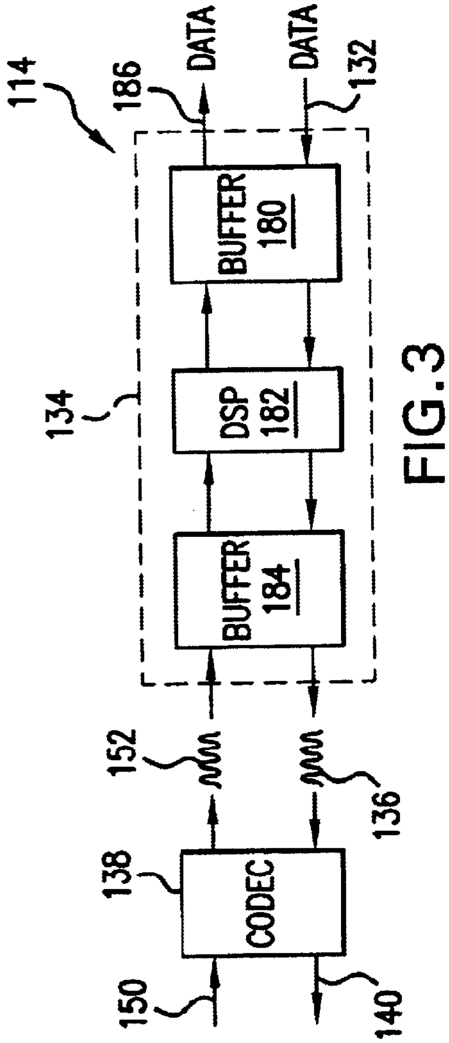
FIG. 3 is a block diagram illustration of the voice path in a modem according to one embodiment of the invention.

FIG. 3 is a block diagram illustration of the voice path in a modem according to one embodiment of the invention. In FIG. 3, remote station MODEM 134 includes a first data interface buffer 180 for non-encoded data coupled to a digital signal processor "DSP" 182, which is coupled to a second data interface buffer 184 for the encoded data. In the uplink direction, buffer 180 stores data to be encoded from data stream 132, and buffer 184 stores encoded data to be transmitted to CODEC 138, while DSP 134 generates the "encoded" or modulated data 136 by accessing a memory portion (not shown) containing the mapping of vocal sounds-to-digital data and operating the data-to-voice conversion algorithm to perform the actual data encoding. In the downlink direction, buffer 184 stores the "encoded" or modulated bearer data 152 received from CODEC 138 to be decoded, and buffer 180 stores "decoded" or demodulated data to transmit as data stream 186, while DSP 134 decodes the information at the receiving end by accessing a memory portion (not shown) containing the mapping of vocal sounds-to-digital data, or an analog thereof, and operating an analog of the data-to-voice conversion algorithm which was used to generate the modulated data.

Upon detecting the synchronization data pattern, DSP 134 resets respective counters (not shown) associated with buffers 180 and 184, and begins a new voice frame cycle. In the "encode" or uplink direction, a frame's worth of unconverted data are acquired in buffer 180. The actual number of bytes or bits in the frame varies depending on the compression ratio in VOCODER 142. The frame's worth of unconverted data previously stored in buffer 180 are received and encoded by DSP 182 into modulated data, which is delivered to buffer 184 and output to CODEC 138, preferably including newly inserted synchronization data pattern and control bytes. In the "decode" or downlink direction, the next serial clock count delivers the first bit of bearer data of the incoming voice frame into buffer 184. After the bearer data bytes are completely received into buffer 184, they are "decoded" or demodulated by DSP 182 and output by buffer 180.

After the initial voice frame is processed, MODEM 134 looks for the synchronization data pattern to appear again, i.e., immediately following the initial frame at the next base station transmit interval of acquired time slot 130. If detected, synchronization is established at the remote station 114 end of communication path 128. This process is repeated at each successive time slot interval, until the synchronization data pattern is not detected in its expected frame sequence location, indicating that a synchronization problem has occurred. When a synchronization problem occurs, MODEM 134 returns to scanning the incoming data for the synchronization data pattern to appear at any time.

Figure 4:
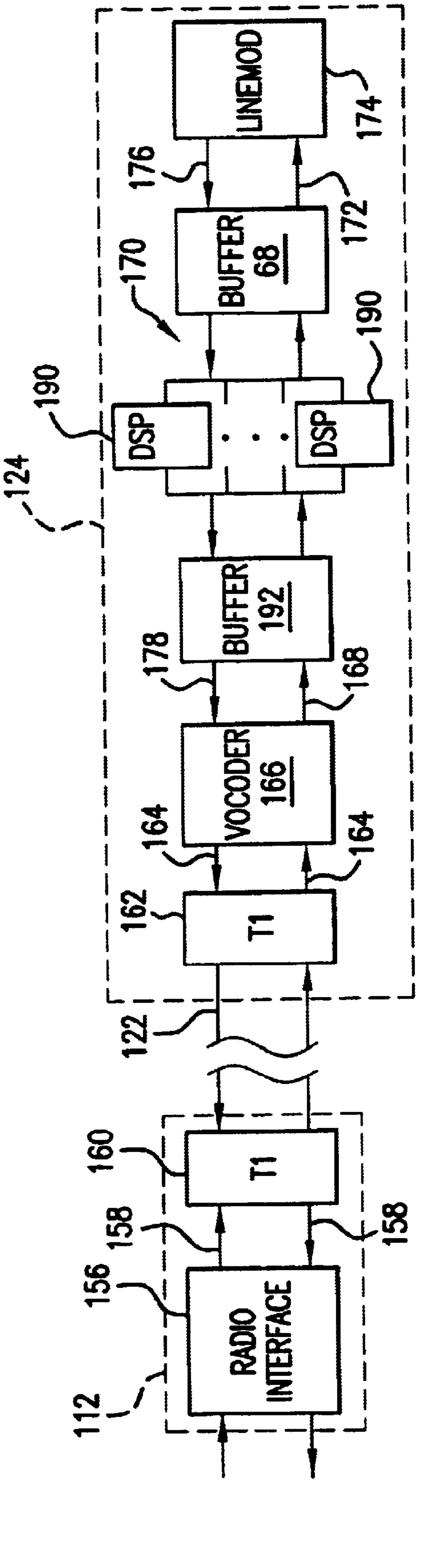
FIG. 4 illustrates one embodiment of modem of the invention in combination with other elements of one embodiment of the base station of the invention.

FIG. 4 illustrates one embodiment of MODEM 170 of the invention in combination with other elements of one embodiment of BSC 124 of the invention. In FIG. 4, MODEM 170 at BSC 124 includes a first non-encoded data interface buffer 188 coupled to line module 174, one or more DSPs 190 and a second encoded data interface buffer 192 coupled to BSC interface module 162 for storing encoded data. In the downlink direction, buffer 188 stores non-encoded data from data stream 176. DSP 190, which is optionally a selected DSP 190 from an optional group of multiple DSPs 190, generates the modulated data by accessing a memory portion (not shown) containing the mapping of vocal sounds-to-digital data and operating the above described data-to-voice conversion algorithm or one of the alternative algorithms to perform the actual data encoding. Buffer 192 stores "encoded" or modulated data to be transmitted to BSC interface module 162 and on to base station 112 for transmission over communication path 128. In the uplink direction, buffer 192 stores "encoded" or modulated bearer data to be demodulated received from base station radio interface circuit 156 via backhaul facility 122 of the voice path data associated with communication path 128. DSP 190 decodes the information at the receiving end by accessing a memory portion (not shown) containing the mapping of vocal sounds-to-digital data, or an analog thereof, and operating an analog of the data-to-voice conversion algorithm which was used by remote station 114 to generate the modulated data. Buffer 188 stores the demodulated data and recently demodulated data to transmit as demodulated data stream 168.

Upon initially detecting the synchronization data pattern, selected DSP 190 resets respective counters (not shown) associated with buffers 188 and 192, and begins a new base station voice frame cycle. In the "encode" or downlink direction, a frame's worth of unconverted data are be acquired in buffer 188. The actual number of bytes or bits in the frame varies depending on the compression ratio in VOCODER 166. The frame's worth of unconverted data previously stored in buffer 188 are received and encoded by DSP 190 into a modulated voice signal which is delivered to buffer 192 and output to interface module 162 via VOCODER 166, preferably including newly inserted synchronization data pattern and control bytes. In the "decode" or uplink direction, preferably the next serial clock count will deliver the first bit of bearer data of the incoming voice frame into buffer 192. After the bearer data bytes are completely received into buffer 192, they are "decoded" or demodulated by DSP 190, stored in buffer 188 and transmitted serially as uplink signal 168 to line module 174. Because DSP 190 and VOCODER 166 are remotely located from base station 112, i.e., coupled by backhaul facility 122, an extra delay over the air loop cycle occurs during the transmission of the voice frames in each direction between base station radio interface 156 and VOCODER 166 and DSP 190. Furthermore, as discussed above, the extra delay is of a variable length in a satellite telecommunications transmission. The variable delay rules out use of a strict timing scheme for determining the period to change bits. This variable delay is overcome by insertion of the above described byte and bit synchronization data pattern into the voice frame, where a self-clocking bit, such as a "v" voiced signal, synchronizes the change between bytes, and a change between voiced an unvoiced vocal sounds synchronizes the change between bits.

While the preferred embodiment of the invention has been illustrated and described, it will be appreciated that various changes can be made therein without departing from the spirit and scope of the invention.

What is claimed is:

1. A method for converting a signal conveying digital data to a signal conveying the digital data as vocal tract sounds, the method comprising:

modulating digital data into vocal tract sounds compatible with a voice compression scheme;

compressing the modulated digital data using the voice compression scheme;

decompressing a signal including said compressed, modulated digital data; and demodulating said decompressed, modulated digital data to recover said digital data.

2. The method recited in claim 1, wherein said modulating further comprises encoding said digital data according to a predetermined dictionary of vocal sounds.

3. The method recited in claim 2, wherein said demodulation further comprises converting said vocal tract sounds into said digital data according to an analog of said dictionary.

4. The method recited in claim 3, wherein said vocal sounds further comprise vocal sounds distinguishable by a predetermined voice encoder/decoder.

5. The method recited in claim 4, further comprising encoding self clocking data with said digital data.

6. The method recited in claim 4, wherein vocal sounds further comprise different voiced and unvoiced sounds.

7. The method recited in claim 6, wherein said voiced sound further comprises a voiced vowel sound; and said unvoiced sound further comprises an unvoiced consonant sound.

8. The method recited in claim 6, wherein said encoding further comprises changing between said voiced and unvoiced sounds.

9. The method recited in claim 8, wherein said voiced sound further comprises one or more of a plurality of voiced sounds; and said unvoiced sound further comprises one or more of a plurality of unvoiced sounds.

10. The method recited in claim 8, further comprising one or more predetermined vocal sounds between groups of said voiced and unvoiced sounds.

11. The method recited in claim 10, wherein said one or more predetermined vocal sounds between groups of said voiced and unvoiced sounds further comprises one of a predetermined voiced sound and a predetermined unvoiced sound.

12. A modulator/demodulator embodying the method recited in claim 1.

13. A method for using an electronic circuit to convert a signal conveying digital data to a signal conveying the digital data as a plurality of voice track sounds, the method comprising:

a) processing the signal as a first digital data signal;

b) with the electronic circuit, converting said digital data according to a predetermined dictionary of vocal sounds having respective binary values to obtain a vocal signal comprising a plurality of said vocal sounds corresponding to respective ones of a plurality of said digital data; and c) with the electronic circuit, encoding changes between voiced and unvoiced ones of said vocal sounds to thereby provide self-clocking of said vocal signal.

14. The method recited in claim 13, further comprising, with the electronic circuit, converting a received one of said converted digital data signals according to an analog of said dictionary to obtain a second digital data signal substantially identical to the digital data signal used to generate said received one of said converted digital data signals.

15. The method recited in claim 14, wherein:

said converting said digital data according to a predetermined dictionary of vocal sounds further comprises operating a data-to-voice conversion algorithm to generate modulated data; and said converting a received one of said converted digital data signals further comprises operating an analog of said data-to-voice conversion algorithm.

16. The method recited in claim 15, wherein one or more binary digits are encoded per change between said voiced and unvoiced sounds.

17. The method recited in claim 16, further comprising one or more predetermined vocal sounds between words formed of said binary digits.

18. The method recited in claim 17, further comprising one or more predetermined vocal sounds between words formed of said binary digits.

19. A method for converting a stream conveying digital data to a stream conveying the digital data as vocal tract sounds, the method comprising:

modulating a stream of digital data into a vocal signal formed of voiced and unvoiced vocal sounds;

compressing said modulated data in accordance with a voice compression scheme;

transmitting said modulated and compressed data via a telecommunication transmission medium;

decompressing said transmitted data in accordance with said voice compression scheme; and demodulating said decompressed modulated data.

20. The method recited in claim 19, wherein said modulating further comprises operating a data-to-voice conversion algorithm.

21. The method recited in claim 20, wherein said demodulating further comprises operating an analog of said data-to-voice conversion algorithm.

22. A modulator/demodulator for converting between digital data and vocal sounds for transmission of digital data over narrow bandwidth telecommunication transmission media, the modulator/demodulator comprising:

a first data interface buffer having non-encoded digital data stored therein;

a digital signal processor coupled to said first buffer, said digital signal processor operating a data-to-voice conversion algorithm that encodes changes between voiced and unvoiced vocal sounds, to thereby provide the self-clocking of the data that is converted using the algorithm; and a second data interface buffer having encoded digital data stored therein.

23. The modulator/demodulator recited in claim 22, wherein said data-to-voice conversion algorithm modulates said digital data into vocal tract sounds compatible with a voice compression system.

24. The modulator/demodulator recited in claim 23, further comprising a memory portion coupled to said digital signal processor and having stored therein a mapping of said vocal tract sounds to respective predetermined binary values.

25. The modulator/demodulator recited in claim 24, wherein said digital signal processor further operates a voice-to-data conversion algorithm.

26. The modulator/demodulator recited in claim 25, wherein said voice-to-data conversion algorithm further comprises an analog of said data-to-voice conversion algorithm.

* * * * *